May 29, 1923.
F. C. WARNE
DISK HARROW
Filed April 10, 1920
1,457,277
3 Sheets-Sheet 1
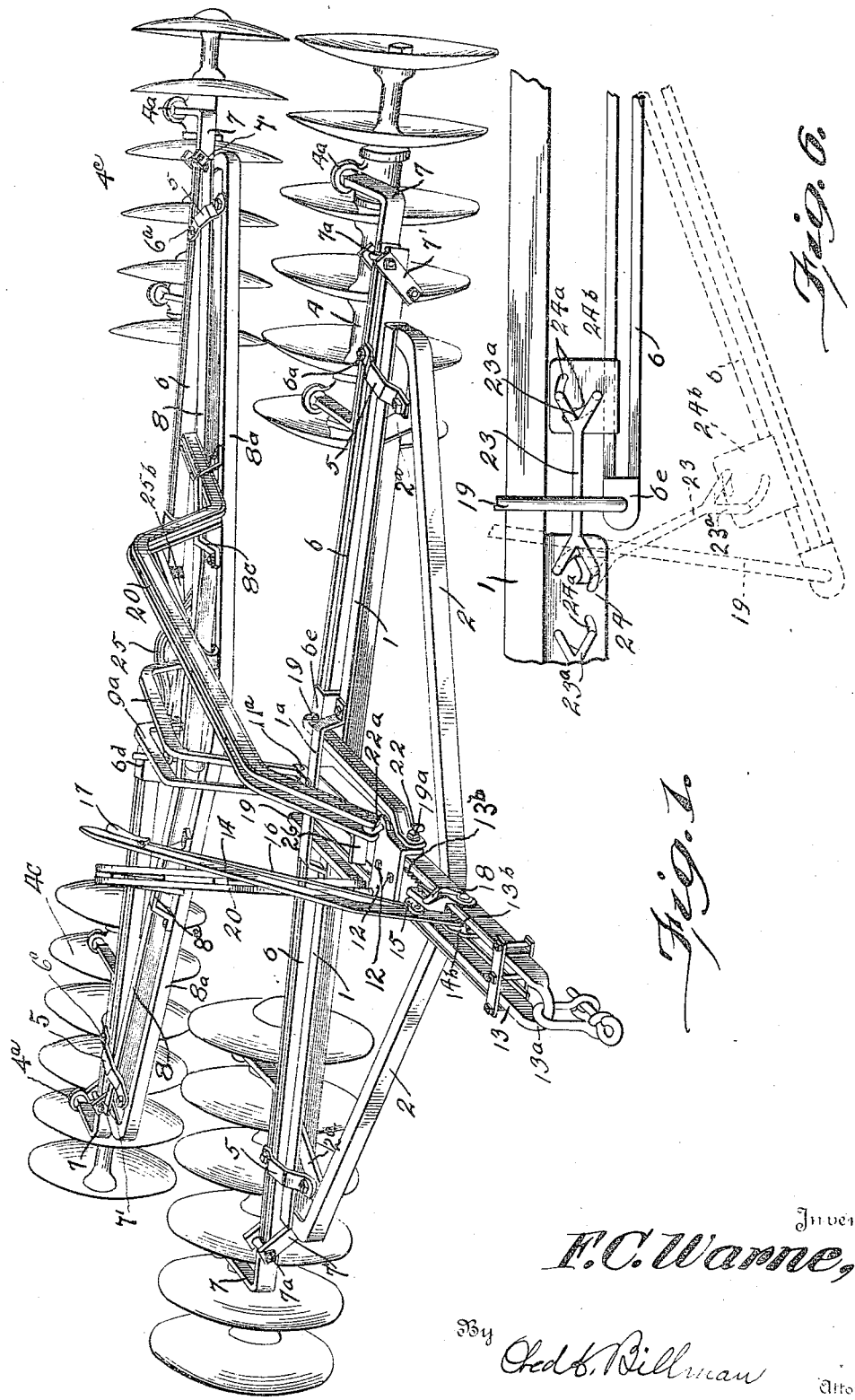

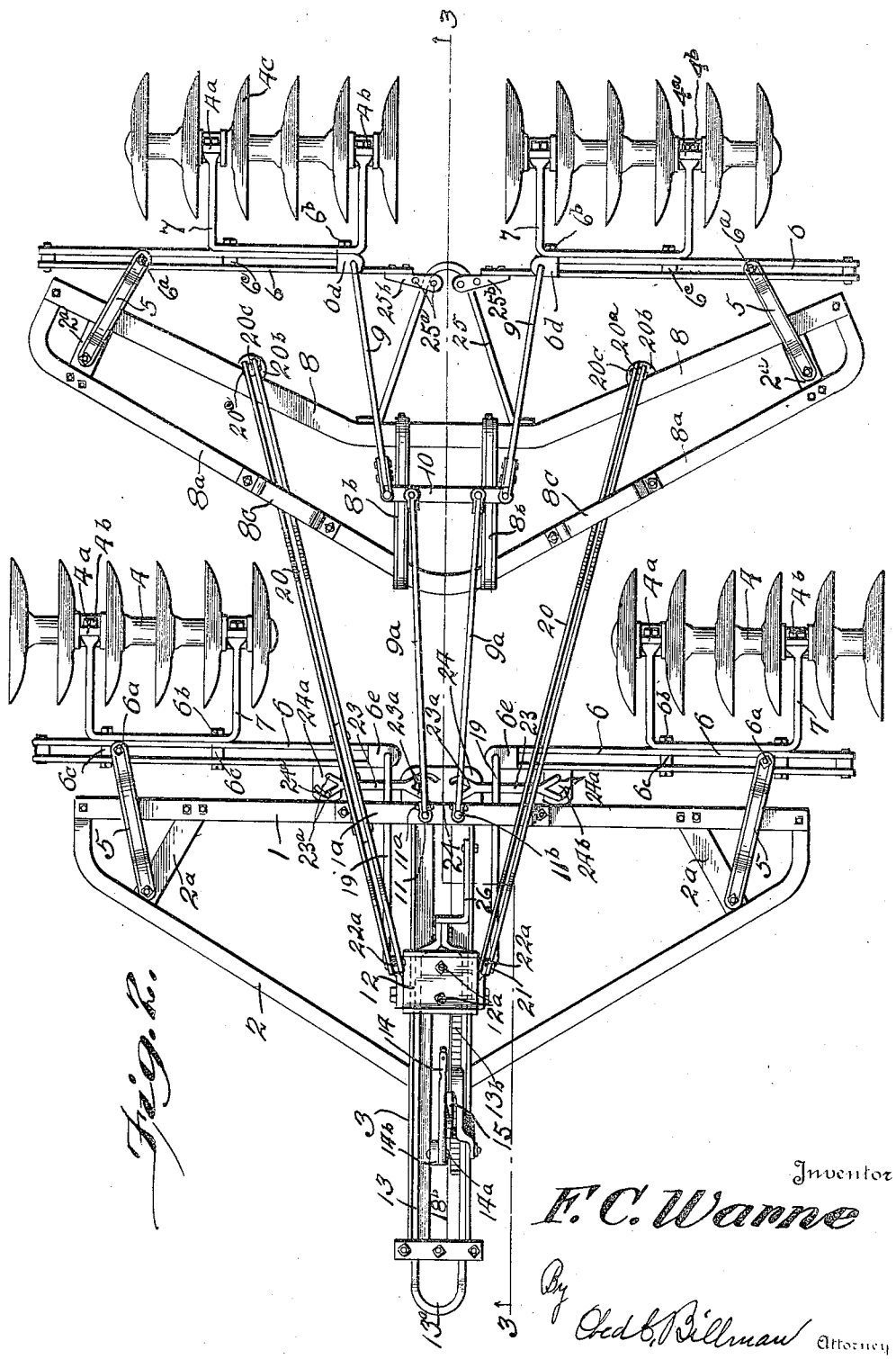

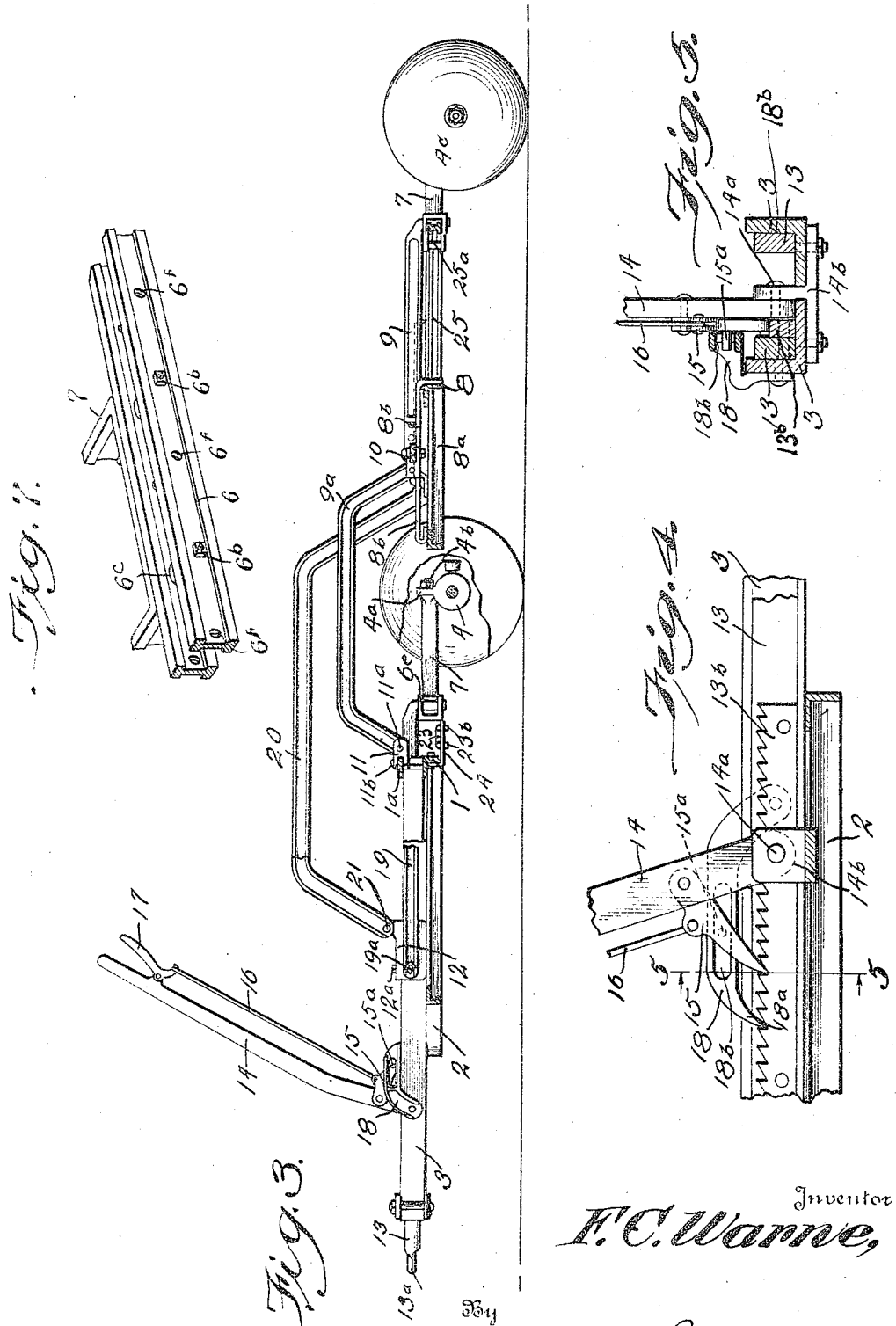

Patented May 29, 1923.

1,457,277

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

DISK HARROW.

Application filed April 10, 1920. Serial No. 372,825.

*To all whom it may concern:*

Be it known that I, FREDERICK C. WARNE, a citizen of the United States, residing at Mansfield, in the county of Richland and State of Ohio, have invented certain new and useful Improvements in Disk Harrows, of which the following is a specification.

My invention relates to improvements in disk harrows, and more particularly to that class or type known as "double" or "tandem" disk harrows, in which front and rear units are employed, each unit embodying a pair of adjustably mounted rotary disk gangs adapted to be angled or turned in opposite directions relative to each other and to the line of draft, as disclosed for example in Warne's Patent No. 1,189,890, of July 4th, 1916.

This invention further relates to that class or type of double disk harrows known as "engine disk harrows," the present improvements being particularly designed and adapted for use in connection with engines or tractors, and with this end in view the improved harrow embodies improved draft connections, together with improved adjusting and locking mechanism whereby the disk gangs may be readily moved to and secured in the desired angular position to each other and to the line of draft by the operator of the tractor while in the seat or cab of the latter, the construction and arrangement of the parts being such that when the disk gangs are locked in their normal working or fully angled position, or in an intermediate angled position, and are relatively released or unlocked by the operator thru such mechanism while the tractor is in motion, such disk gangs will automatically assume thru such draft connections their non-working or non-angled transporting position, or less angular working position, as the case may be, and as the operator may elect, and may be stopped and locked in such elected position while the tractor is in motion, as disclosed in my application filed May 16, 1918, Serial No. 234,873.

The present improvements relate more particularly to what are known as "orchard disk harrows", and therefore as contra-distinguished from the ordinary field harrow of the class indicated, is provided with relatively low front and rear harrow frames, together with improved flexibly connected floating gang members, or bars, and improved tillage disk gangs, transversely and angularly adjustable on said gang members, or bars, whereby such tillage gangs may be readily adjusted in width or transversely to conform to the varying widths of the spaces between the rows of growing trees in the different orchards or orange groves to be cultivated. The tilting of the tillage gangs to any desired angle of incidence to the common horizontal plane of the floating gang members or bars, is of particular advantage in conforming the tillage gangs to the "terraces" found in orchards and orange groves to prevent washing of the soil, and particularly so on hillsides and the like.

My invention further relates to means for connecting and guiding the inner ends of the flexibly connected floating gang members or bars with respect to the tandem frame units, whereby the disks of the front and rear tillage gangs are held in such relatively transversely fixed or constant relation to each other, irrespective of the angular adjustment given to the same thru the floating gang members, that the disks of the rear gangs will traverse or cut the ridges left by the disks of the forward gangs in all of the varying adjustments.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a perspective view of a disk harrow constructed in accordance with this invention, taken from the front and to one side of same, and illustrating in particular the draft appliance and its relatively fixed and movable draft connections and adjusting and locking mechanism, the disk gangs being set in their extreme outer adjusted positions on the flexibly connected gang members or bars, and the gangs being in their straightened or non-angular, non-working or transporting positions.

Fig. 2, a top plan view of the same, the front tillage gangs being adjusted in an intermediate position on the gang bars or frames, and the rear tillage gangs being set in their extreme inner positions thereon, for the purpose of illustrating the different lateral or horizontal adjustments thereof.

Fig. 3, a central longitudinal section view taken on line 3—3 of Fig. 2.

Fig. 4, an enlarged central longitudinal sectional view of the stub-pole and longitudinally movable draft appliance, and illustrating the lever actuating and adjusting mechanism for moving and locking the relatively fixed and movable draft members in varying positions.

Fig. 5, a cross-sectional view of the same taken on line 5—5 of Fig. 4.

Fig. 6, a detail plan view of a portion of one of the floating gang bars and the guide bars employed in conjunction therewith and Fig. 7, a detail perspective view of one of the gang bars illustrating the openings formed therein for adjustment of the gangs in different positions along the same.

Similar numerals of reference designate like parts thruout all the figures of the drawings.

The improved harrow or tillage implement comprises a front harrow section or unit, and a rear or trailing harrow section or unit. The front harrow section, or frame unit, embodies a suitable draft frame consisting, in the present instance, of a transverse bar 1, and a curved draft frame member 2, the latter having its forward middle portion secured to a stub pole 3, which latter is made up of spaced angle bars secured at their rear to the transverse bar or member 1, and, in the present instance, forming a guide or slide-way for the improved longitudinally movable draft appliance hereinafter described.

As a means of connecting the draft frame to the front disk gangs 4, draft bars or links 5, are pivotally connected to filler members or blocks 2$^a$, said links extending rearwardly and being flexibly connected to floating gang members or bars 6, somewhat beyond the centers of the floating gang bars 6, so that the inner ends of the latter will have a tendency to swing rearwardly and assume a rearwardly converging position, and irrespective of the different transverse or lateral adjustments of the disk gangs on the gang bars 6, as will be apparent on reference to Fig. 2, of the drawing.

The links 5, are arranged in pairs above and below the transverse bar 1, and are pivotally connected to the floating gang bars 6, by means of suitable pivot bolts 6$^a$, extending thru suitable bearing or filler members in the members of gang bars.

As a means of securing the disk gangs 4, to the floating gang members 6, in various transverse adjustments to conform to varying spaces between trees being cultivated, the disk gangs are provided with yoke or bracket members 7, the ends of the yoke members 7 extending thru suitable bearings 4$^a$, and being secured by means of bolts 4$^b$, the forward portions of the yokes or brackets 7, being secured to the rear sides of the gang bars 6, by means of bolts 6$^b$. The bolts 6$^b$ extends thru suitable openings formed thru the gang bars 6, and thru suitable spacing fillers 6$^c$, the openings 6$^f$ for the bolts 6$^b$, being formed at pre-determined distances apart.

As a means of securing the yoke or bracket members 7, and the disk gangs 4, in varying angular positions to the common horizontal plane of the floating gang bar 6, to conform the same to the angle of the "terraces" being cultivated, one side of the yoke or bracket may be secured by means of clamps 7', and clamp bolts 7$^a$, as illustrated in Fig. 1 of the drawing, adjusting and securing the same in an obvious manner.

As the rear disk gangs 4$^c$, and bracket members 7, and floating gang bars 6, are mounted and secured to the rear harrow section or trailer frame in a manner similar to the front disk gangs, and are of like form, the above description answers as a description for the like rear parts mentioned.

The rear or trailer frame comprises the forwardly curved bar 8, and the somewhat similarly curved front bar 8$^a$, said frame bars 8, and 8$^a$, being connected at their center by means of central guide members 8$^b$, arranged, in the present instance, at points equally distant from the longitudinal center of the harrow or line of draft.

As a means of connecting the inner ends of the rear gang bars 6, to the front harrow section or frame unit, longitudinally fixed draft bars 9, are provided, said bars 9 being connected at their rear ends to bearing plates 6$^d$ on the gang members and being connected at their front to a cross bar 10, the latter being connected to a second set of longitudinally fixed draft bars 9$^a$, and the latter being flexibly connected to the transverse bar 1, at points equally distant from the line of draft or the common longitudinal center of the implement by means of universal coupling members consisting of horizontal pivots 11$^a$, mounted in clips 11, (see Fig. 3) the latter being secured to the transverse bar by means of vertical pivots 11$^b$. The cross bar 10, rests upon the guide members or elements 8$^b$, and the latter are adapted to frictionally ride beneath the cross bar 10, as the rear or trailer harrow section or frame unit is moved relatively by the relatively movable draft connections as hereinafter described.

Referring now to the improved draft appliance and its gang connecting, adjusting and controlling mechanism whereby the operator of the tractor, while in his usual driving position on the latter, and when the implement gangs are locked in their normal or fully angled positions, or in intermediate angled positions, and are relatively released or unlocked while the tractor is in motion, will permit such gangs to automatically assume, thru such draft connections, their non-working, non-angled transporting positions, or various angular working positions, as the case may be, and as the operator may elect, and whereby the same may be stopped and locked in any such elected positions, it will be seen that the improved draft appliance comprises a longitudinally movable draft member or element mounted, in the present instance, in the stub pole 3, of the draft frame, and consisting, in the present instance, of a draft block or head 12, adapted to slide along the angular members of the stub pole 3, said block 12 being controlled by a longitudinally movable draft bar or yoke 13, terminating at its forward end in a draft loop 13$^a$. The draft loop 13$^a$ is adapted to be attached to the tractor, and as a means of operating and controlling the movements of the draft bar or yoke 13, the draft block or head 12, and the connections leading from the latter to the inner ends of the floating gang bars 6, at front, and to the rear or trailer frame units at the rear, as hereinafter described, one side of the draft bar or yoke 13 is provided with a toothed rack 13$^b$, and as a means of enabling the operator to readily move the draft block or head 12, and its attachments, together with the stub pole 3, and its attachments, relative to each other, an operating hand lever 14 is pivotally mounted to the stub pole 3, thru the medium of a suitable bearing bolt 14$^a$, connected to a suitable clip 14$^b$, said hand lever extending upwardly within ready reach of the operator of the tractor, as shown.

As a means of intermittently engaging and feeding the draft bar or yoke 13 rearwardly thru working impulses imparted to the hand lever 14, the lower portion of the latter is provided with a pivoted pawl 15, adapted to be moved to a released position by means of the rod 16 leading to a releasing lever 17, at the handle portion of the hand lever.

As a means of preventing any shifting or retrograde movement of the draft bar 13, and toothed rack 13$^b$, after each working impulse given to the hand lever 14, the stub pole 3 is provided at one side with a pivoted locking dog, 18, the latter being provided with a detent 18$^a$, adapted to normally ride upon the teeth of the rack 13$^b$, and as a means of simultaneously releasing the pivoted pawl 15 and locking dog 18, and holding such parts in such released positions for the extended shifting or forward movement of the draft bar 13, and its attachments, by the forward draft of the tractor, the locking dog is provided with a slot or guideway 18$^b$, loosely receiving and containing a pin or projection 15$^a$, extending laterally from the lever pawl 15, so that when the free end of the pivoted pawl 15 is moved in an extended upward direction it will engage in the upper portion of the slot or guideway and raise and hold the locking dog 18, out of engagement with the teeth of the rack.

As a means of permitting a limited movement between the draft bar or yoke 13, and the draft block or head 12, the upper and lower plates of such draft block are connected by means of vertical bolts 12$^a$, the latter extending through the space or guideway formed by the spaced sides of the draft yoke 13. It is obvious that this slotted arrangement between the bar or yoke 13 and the bolts 12$^a$ of the draft block, will permit the draft bar 13, when the implement is in its angular or working position as regards the tillage gangs, to be moved rearwardly or to an intermediate position without moving the draft block 12 and its connections. When the harrow is moved forwardly the disk gangs will assume a predetermined angular position in accordance with the position thus given to the draft bar or yoke.

The draft connections leading from the draft appliance to the inner ends of the front gang bars 6, and to the rear harrow frame, comprise longitudinally movable draft bars 19, leading from the sides of the draft block 12, thru the medium of pivot bolts 19$^a$, said draft bars extending rearwardly and being pivotally connected in bearings 6$^e$, at the inner ends of the gang bars 6, said movable draft bars 19 extending rearwardly thru the keeper plate 1$^a$, on the transverse bar 1, to which latter the vertical pivot 11$^b$ of the relatively fixed draft bars 9$^a$ and 9 are secured.

The relatively longitudinally movable draft connection leading to the rear or trailer harrow frame comprise rearwardly diverging draft or reach bars 20, the latter, in the present instance, being pivotally secured to the rear bar 8, of the rear frame, thru the medium of pivot pins 20$^a$ mounted in suitable bearings 20$^b$, and the top of the pins 20$^a$ being secured to the rear ends of the reach bars by horizontal pins 20$^c$.

The reach bars 20 extend thru keeper plates 8$^c$, on the front bar 8$^a$, of the rear harrow frame, and are connected at their front to the draft head or block 12, by means of transverse pivot bolts 21, extending thru eyes 22$^a$, of vertical pivot bolts 22, mounted in suitable sockets or openings in the sides of the bearing block, as shown most clearly in Fig. 1 of the drawings.

By reason of the above construction, it is apparent that the draft or reach bars 20, connected to the intermediate portions of the rear harrow frame are in effect indirectly connected to the pivoted portions 6$^a$, of the rear disk gangs, or bars 6, connected by the links 5.

As a means of connecting and guiding the inner ends of the tandem floating gang bars 6, whereby the tillage gangs carried thereby are held in proper relatively fixed transverse positions to each other as the floating gang bars 6, and disk gangs are moved angularly thru the relative movements of the relatively fixed and movable connections above described, and whereby the disks of the rear gangs will always traverse the ridges left by the disks of the forward gangs, suitable guiding elements are interposed between the median portions of the front and rear harrow frames, said holding and guiding elements for the inner ends of the front gang bars 6, in the present instance, comprising floating guide bars 23, at the front, and having forked ends 23$^a$ terminating in depending bearing studs or ends 23$^b$, extending into and having movement within curved bearing slots 24$^a$, in bearing plates 24 and 24$^b$. The bearing plates 24 are mounted at the center of the transverse bar 1, of the front harrow frame, and the bearing plates 24$^b$, are formed at the inner ends of the front gang bars, so that as the latter assume their rearwardly converging angle the same will be moved toward the dotted line position shown in Fig. 6 of the drawing, the pressure of the forward gangs being toward each other, as is well known to those skilled in the art.

The guiding and connecting elements for the inner ends of the rear gang bars 6, comprise, in the present instance, a substantially V-shaped guide bracket 25, forming rearwardly converging guide members for guide rollers 25$^a$, mounted in guide brackets 25$^b$, secured to the inner ends of the rear gang bars 6.

The relative arrangement of the forward guide bars 23, and the rear guide members 25, and guide rollers 25$^a$ and brackets 25$^b$, is such with respect to the movements of the parts that the disks in the disk gangs will be held in proper position laterally in their various angular positions for the purposes above mentioned.

When the disk gangs are in their non-angled or parallel transporting positions as shown in Figs. 1 and 2 of the drawings, and it is desired to positively prevent any rearward travel or retrogade movement of the draft bar or yoke 13, while being transported, the rear end of such draft bar may be blocked or locked by throwing the pivoted member 26 forwardly with its transverse portion fitting against the rear end of the draft bar as shown in Fig. 2 of the drawings, thereby positively locking the part so that the disk gangs will be positively held in their parallel transporting positions. When it is desired to angle the bars manually thru the lever while the tractor is in motion, or to set the draft bar for a predetermined angular position of the disk gangs or to permit the gangs when in a fully angled position to assume a less angular position thru the draft of the tractor, the pivoted lever 26 is thrown rearwardly in a reverse position to permit such normal working of the parts.

Having thus described one of the embodiments of my invention, without having attempted to set forth all the forms in which it may be made, or all the modes of its use, what I claim and desire to secure by Letters Patent, is,—

1. In a tillage implement, the combination of tandem frame units; a pair of bars pivotally connected to each of said units; means for simultaneously adjusting the angular relation of said bars to said frame units; a gang of disks for each bar; and means for securing said gangs in place at different positions along said bars.

2. In a tillage implement, the combination of tandem frame units; a pair of bars pivotally connected to each of said units; means for simultaneously adjusting the angular relation of said bars to said frame units; a gang of disks for each bar; and means for securing said gangs in place at various points along the length of said bars and likewise in vertical angular relation to the bars.

3. In a tillage implement, the combination of a front frame; a rear frame; a stub-pole secured to the front frame; a pair of gang supporting bars pivotally attached at their outer ends to each of said frames; a draft block mounted on the stub-pole; a pair of draft bars extending from the draft block to the inner ends respectively of the forward pair of gang supporting bars; a pair of reach bars likewise connected to the draft block and to the rear frame at their rear ends; a pair of draft bars extending from the front frame to the inner end of the rear pair of gang bars; and a gang of disks attached to each of the gang supporting bars.

4. In a tillage implement, the combination of a front frame; a rear frame; a stub-pole secured to the front frame; a pair of gang supporting bars pivotally attached at their outer ends to each of said frames; a draft block mounted on the stub-pole; a pair of draft bars extending from the draft block to the inner ends respectively of the forward pair of gang supporting bars; a pair of reach bars likewise connected to the draft block and to the rear frame at their rear ends; a pair of draft bars extending from the front frame to the inner end of the rear pair of gang bars; and a gang of disks attached to each of the gang supporting bars, the means of attachment providing for longitudinal and angular adjustment of the gangs with reference to the supporting bars.

5. In a harrow, the combination of a frame; a link pivotally connected thereto and extending rearwardly therefrom; a gang disk supporting bar pivotally connected adjacent one end to the rear end of the link; a radius bar having a sliding connection with the opposite end of the supporting bar and likewise with a fixed portion of the frame; means for adjusting the disk supporting bar in angular relation to the frame; and a gang of disks carried by the bar.

6. In a harrow, the combination of a frame; a stub-pole extending therefrom; a draft bar carried thereby; a draft block secured to said bar; a link pivotally connected to the frame member adjacent each end thereof; a pair of gang supporting bars located in rear of the frame and pivotally attached respectively to said links; a radius bar interposed between a fixed portion of the frame and the inner end of each of said gang bars; and draft bars extending from the draft block to the gang bars.

7. In a harrow, the combination of a frame; a stub-pole extending therefrom; a draft bar carried thereby; a draft block secured to said bar; a link pivotally connected to the frame member adjacent each end thereof; a pair of gang supporting bars located in rear of the frame and pivotally attached respectively to said links; a radius bar interposed between a fixed portion of the frame and the inner end of each of said gang bars; draft bars extending from the draft block to the gang bars; a second frame located in rear of the frame aforesaid; reach bars extending from the draft block to said second frame; a V-shaped guide bracket attached to and extending rearwardly from said frame; a link pivotally connected to each end of the second frame; a second pair of gang supporting bars, said bars being connected respectively to one of the links and having its inner end slidably connected to the guide bracket; and draft bars extending from the first frame to the second pair of gang supporting bars.

8. In a disk harrow, the combination of a front frame; a rear frame; a pair of bars located in rear of each of said frames and pivotally attached adjacent their outer ends to the frame immediately adjacent thereto; a gang of disks attached to each of said bars; a stub-pole connected to and extending forwardly from the front frame member; a draft bar or yoke slidably supported by said pole; a draft block secured to said bar; connections extending rearwardly from said block to the inner ends of the forward pair of gang supporting bars; reach bars extending from the block to the rear frame; means for securing adjustment of said block and consequently the forward pair of gang supporting bars and rear frame; and connections between the front frame and the rear pair of gang bars.

9. In a disk harrow, the combination of a front frame; a rear frame; a pair of bars located in rear of each of said frames and pivotally attached adjacent their outer ends to the frame immediately adjacent thereto; a gang of disks attached to each of said bars; a stub-pole connected to and extending forwardly from the front frame member; a draft bar or yoke slidably supported by said pole; a draft block secured to said bar; connections extending rearwardly from said block to the inner ends of the forward pair of gang supporting bars; reach bars extending from the block to the rear frame; means for securing adjustment of said block and consequently the forward pair of gang supporting bars and rear frame; connections between the front frame and the rear pair of gang bars; and means under the control of the operator for adjusting the position of the draft block with reference to the forward frame and thereby determining the angularity of the disk gangs.

10. In a harrow, the combination of a front and a rear frame; disk gang supporting bars connected to said frames for angular adjustment with reference thereto; draft connections extending from the front frame to the gang bars attached to the rear frame; draft mechanism adjustably mounted on the forward frame; draft bars extending from said mechanism to the forward pair of gang supporting bars; and other draft bars extending from the draft mechanism to the rear frame.

11. In a harrow, a front frame; a rear frame; gang supporting bars pivotally attached to the rear frame for angular adjustment with reference thereto; means for holding one end of the gang bars attached to the rear frame in fixed spaced relation to the front frame; and means for spacing the front and rear frames toward and from each other whereby the angularity of the rear gang bars will be accordingly changed.

12. In a harrow, the combination of a front frame; a rear frame; gang supporting bars pivotally attached to each frame for angular adjustment with reference thereto; means for holding one end of the gang bars, attached to the rear frame, in fixed spaced relation to the front frame; draft mechanism adjustable forwardly and rearwardly with reference to the front frame; connections extending therefrom to the rear frame whereby the front and rear frames may be spaced toward and from each other and the angular position of the rear gang bars accordingly varied; and means extending from the draft mechanism to the front gang bars for likewise varying the angular position thereof as said draft mechanism is shifted.

13. In a harrow, the combination of a frame; a stub-pole connected to and extending forwardly therefrom; a draft block; a draft yoke connected to the block; a rack carried by the draft yoke; a lever having a pivotal connection with the stub-pole; a pawl carried by the lever and engaging the rack to move the yoke relatively to the pole when the lever is swung in one direction; and a locking dog for the rack said detent having such a connection with the pawl as to lift the detent free of the rack when the pawl is raised into inoperative position.

14. In a harrow, the combination of a frame; a stub-pole connected to and extending forwardly therefrom; a draft block; a draft yoke connected to the draft block and slidably mounted in the pole; a rack carried by the draft yoke; a lever having a pivotal connection with the stub pole; a pawl carried by the lever and engaging the rack to move the yoke relatively to the pole when the lever is swung in one direction; a locking dog pivoted to the stub-pole and in normal engagement with the rack to prevent retrograde movement of the parts, said dog having a slot formed in the body thereof; and a pin extending from the pawl and entering the slot.

In testimony whereof I have affixed my signature.

FREDERICK C. WARNE.